US011002175B2

(12) United States Patent
Kight et al.

(10) Patent No.: US 11,002,175 B2
(45) Date of Patent: May 11, 2021

(54) SYSTEM AND METHOD INVOLVING A VARIABLE SPEED COOLING FAN USED WITH A COMPRESSOR AND AN INTERNAL COMBUSTION ENGINE

(71) Applicant: ALFA LAVAL CORPORATE AB, Lund (SE)

(72) Inventors: Rusty Kight, Coweta, OK (US); Blake Minton, Broken Arrow, OK (US); Chris Jungers, Tulsa, OK (US)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 16/119,271

(22) Filed: Aug. 31, 2018

(65) Prior Publication Data

US 2018/0371981 A1    Dec. 27, 2018

Related U.S. Application Data

(63) Continuation-in-part of application No. 16/081,392, filed as application No. PCT/EP2017/056332 on Mar.
(Continued)

(51) Int. Cl.
*F01P 7/04* (2006.01)
*F04D 25/02* (2006.01)
(Continued)

(52) U.S. Cl.
CPC .............. *F01P 7/048* (2013.01); *F01P 5/04* (2013.01); *F04B 35/002* (2013.01); *F04D 17/12* (2013.01);
(Continued)

(58) Field of Classification Search
CPC ........ F04D 17/12; F04D 25/02; F04D 25/022; F04D 25/026; F04D 25/04; F04D 25/16;
(Continued)

(56) References Cited

U.S. PATENT DOCUMENTS 3,120,219 A * 2/1964 Nallinger ................ F01P 7/042
123/41.12
3,853,098 A * 12/1974 Ishikawa ................... F01P 5/04
123/41.11
(Continued)

FOREIGN PATENT DOCUMENTS

CN            203081761 U      7/2013
DE    10 2013003754 A *    11/2014
(Continued)

OTHER PUBLICATIONS

CN 10863320, Chinese Patent Document; Jun. 2018; China.*
(Continued)

*Primary Examiner* — Charles G Freay
(74) *Attorney, Agent, or Firm* — Buchanan Ingersoll & Rooney PC

(57) ABSTRACT

A system and method of a variable speed cooling fan for a skid mounted compressor. A magnetic variable speed clutch is mounted to the cooling fan drive shaft. The clutch mechanism is driven via by a drive pulley on the crankshaft of the engine driving the compressor. The speed of the fan is varied dependent upon the temperature of the fluids being cooled.

12 Claims, 4 Drawing Sheets

Related U.S. Application Data 17, 2017, which is a continuation of application No. 15/074,299, filed on Mar. 18, 2016, now abandoned.

(51) Int. Cl.

| | | |
|---|---|---|
| *F04D 25/16* | (2006.01) | |
| *F04D 27/00* | (2006.01) | |
| *F04D 29/58* | (2006.01) | |
| *F04D 17/12* | (2006.01) | |
| *F04D 25/04* | (2006.01) | |
| *F01P 5/04* | (2006.01) | |
| *F04B 35/00* | (2006.01) | |
| *F04D 19/00* | (2006.01) | |
| *H02K 49/04* | (2006.01) | |
| *H02P 15/00* | (2006.01) | |

(52) U.S. Cl.
CPC ........... *F04D 19/002* (2013.01); *F04D 25/02* (2013.01); *F04D 25/022* (2013.01); *F04D 25/026* (2013.01); *F04D 25/04* (2013.01); *F04D 25/16* (2013.01); *F04D 25/166* (2013.01); *F04D 27/004* (2013.01); *F04D 29/584* (2013.01); *F04D 29/5826* (2013.01); *H02K 49/04* (2013.01); *H02P 15/00* (2013.01)

(58) Field of Classification Search
CPC .... F04D 25/166; F04D 27/004; F04D 19/002; F04D 29/5826; F04D 29/584; F04B 35/002; F01P 7/048; F01P 5/04; H02P 15/00; H02K 49/04
USPC .......................... 417/223, 312, 362, 364, 243
See application file for complete search history.

(56) References Cited

U.S. PATENT DOCUMENTS

| | | | | | |
|---|---|---|---|---|---|
| 4,124,001 | A | * | 11/1978 | Samuel | F01P 7/048 123/41.12 |
| 4,228,691 | A | * | 10/1980 | Smirl | F16H 61/66259 474/12 |
| 5,362,207 | A | * | 11/1994 | Martin | F04D 25/02 165/140 |
| 5,477,093 | A | * | 12/1995 | Lamb | H02K 49/046 310/75 D |
| 5,834,872 | A | * | 11/1998 | Lamb | H02K 49/046 310/103 |
| 5,873,708 | A | * | 2/1999 | Delhomme, II | F04B 35/002 181/204 |
| 5,989,151 | A | * | 11/1999 | Kershaw | F01P 7/048 123/41.12 |
| 6,054,788 | A | * | 4/2000 | Dombrovski | H02K 49/00 310/103 |
| 6,129,193 | A | | 10/2000 | Link | |
| 6,176,690 | B1 | * | 1/2001 | Knepp | F04B 39/0044 123/198 E |
| 6,682,430 | B2 | * | 1/2004 | Killen | H02K 49/046 192/84.5 |
| 7,294,947 | B2 | * | 11/2007 | Corbin, III | H02K 49/02 310/103 |
| 7,341,026 | B2 | * | 3/2008 | Laukemann | F01P 7/042 123/41.12 |
| 7,819,634 | B2 | * | 10/2010 | Kolodziej | F04D 29/5826 165/145 |
| 9,165,514 | B2 | * | 10/2015 | Choi | G09G 3/342 |
| 9,394,906 | B2 | * | 7/2016 | Fujimoto | F04C 18/16 |
| 2003/0175128 | A1 | * | 9/2003 | Fabry | F04D 25/00 417/243 |
| 2004/0011306 | A1 | | 1/2004 | Liederman et al. | |
| 2010/0329895 | A1 | * | 12/2010 | Baker | F04D 25/16 417/243 |

FOREIGN PATENT DOCUMENTS

| | | | |
|---|---|---|---|
| DE | 10 2014 216600 | * | 2/2016 |
| JP | 5502818 B2 | * | 3/2014 |

OTHER PUBLICATIONS

Written Opinion of the International Searching Authority dated Oct. 7, 2017 issued by the European Patent Office in corresponding PCT Application No. PCT/EP2017/056332 (6 pages).

International Search Report dated Oct. 7, 2017 issued by the European Patent Office in corresponding PCT Application No. PCT/EP2017/056332 (5 pages).

U.S. Appl. No. 16/081,392, filed Jun. 30, 2016, Kight et al.

\* cited by examiner

SYSTEM AND METHOD INVOLVING A VARIABLE SPEED COOLING FAN USED WITH A COMPRESSOR AND AN INTERNAL COMBUSTION ENGINE

CROSS REFERENCE TO RELATED APPLICATIONS

This application is a continuation-in-part of U.S. application Ser. No. 16/081,392 filed on Aug. 30, 2018, which is a U.S. national stage application based on International Application No. PCT/EP2017/056332 filed on Mar. 17, 2017, which is a continuation of U.S. application Ser. No. 15/074,299 filed on Mar. 18, 2016, the entire content of all three of which is incorporated herein by reference.

FIELD OF THE INVENTION

The present invention relates generally to a system and method for driving a fin fan cooler. More particularly, the present invention relates to a system and method for driving a variable speed fan in a fin fan cooler with an internal combustion engine that powers a compressor.

BACKGROUND DISCUSSION

Skid mounted compressor assemblies are commonly used on well sites for compressing natural gas so it can be shipped via a pipeline. Skid mounted compressor assemblies may also be used at pipeline compressor stations to maintain proper gas pressure in a pipeline. These skid mounted compressor assemblies typically also include, in addition to the compressor, an internal combustion engine which is oftentimes fueled by a small portion of the natural gas being produced. The skid mounted compressor assemblies also typically have a fin fan heat exchanger used to cool the engine and natural gas after and between compression stages. The fin fan heat exchanger has a fan which pushes or pulls ambient air across the heat exchanger to remove heat from the compressed gas and engine coolant. The fan is typically driven via a belt directly off of the crankshaft of the engine without the ability to independently adjust the fan speed. This puts additional load on the engine, leading to additional fuel consumption and additional heat from the engine.

These skid assemblies (i.e., the compressor, the internal combustion engine and the fin fan heat exchanger mounted on a common skid) may operate in extreme conditions including temperatures in excess of 100° F. Thus the heat exchanger, including the fan, should be designed to operate at this extremely high temperature. While the heat exchanger should be capable of operating at this extreme temperature, this extreme temperature is encountered only for a few days every year. Even on those days where the temperature exceeds 100° F., it only does so for a few hours. Nevertheless, the fans used in these skid assemblies have traditionally operated 24 hours a day, 365 days a year at the fan speed necessary for the extreme temperatures. But as noted, these extreme temperatures may exist only for a few hours in the afternoon of the hottest days of the year. Thus, the majority of the time, the fan is operated at a speed that greatly exceeds the fan speed necessary for the temperature conditions. Continually operating the fan at this excess fan speed leads to extraordinary additional fuel consumption and costs of over the course of a year.

Attempts have been made to provide an adjustable cooling fan speed on skid mounted compressor assemblies like those described above. These have been limited to using a hydrostatic clutch mechanism and electrical VFD (variable frequency drive) systems. Electric VFD (variable frequency drive) systems tend not to be a useful solution as they require explosion proof components and enclosures, thus making them cost prohibitive. A hydrostatic clutch mechanism requires additional gearing and drive mechanisms, and does not allow for the direct drive of the cooling fan in an efficient manner. The complexity and expense of these attempted solutions have led to few installations in the industry.

SUMMARY

The system disclosed here provides a relatively simple and efficient way to introduce variability or adjustability into the speed of the fin fan forming part of a fin fan heat exchanger used in conjunction with a compressor that is driven by an engine, such as the skid mounted compressor assembly discussed above. The disclosure here describes a variable (adjustable) speed cooling fan that can be provided as part of a skid mounted compressor assembly that may be used at a wellsite or along a gas pipeline.

The disclosed system includes a magnetic variable speed drive mechanism or device mounted to the cooling fan drive shaft. The drive mechanism may be driven by a drive pulley on the crankshaft of the engine driving the compressor. The speed of the fan is varied through operation of the magnetic variable speed drive dependent upon the temperature of the fluids being cooled.

Thus the disclosed system and method make it possible to reduce the fan speed, for example to the lowest necessary level. This reduces fuel usage and operating costs.

BRIEF DESCRIPTION OF THE DRAWINGS

Preferred embodiments of the system will now be described in further detail. Other features, aspects, and advantages of the system will become better understood with regard to the following detailed description, appended claims, and accompanying drawings (which are not to scale) where:

DETAILED DESCRIPTION

Figure 1:
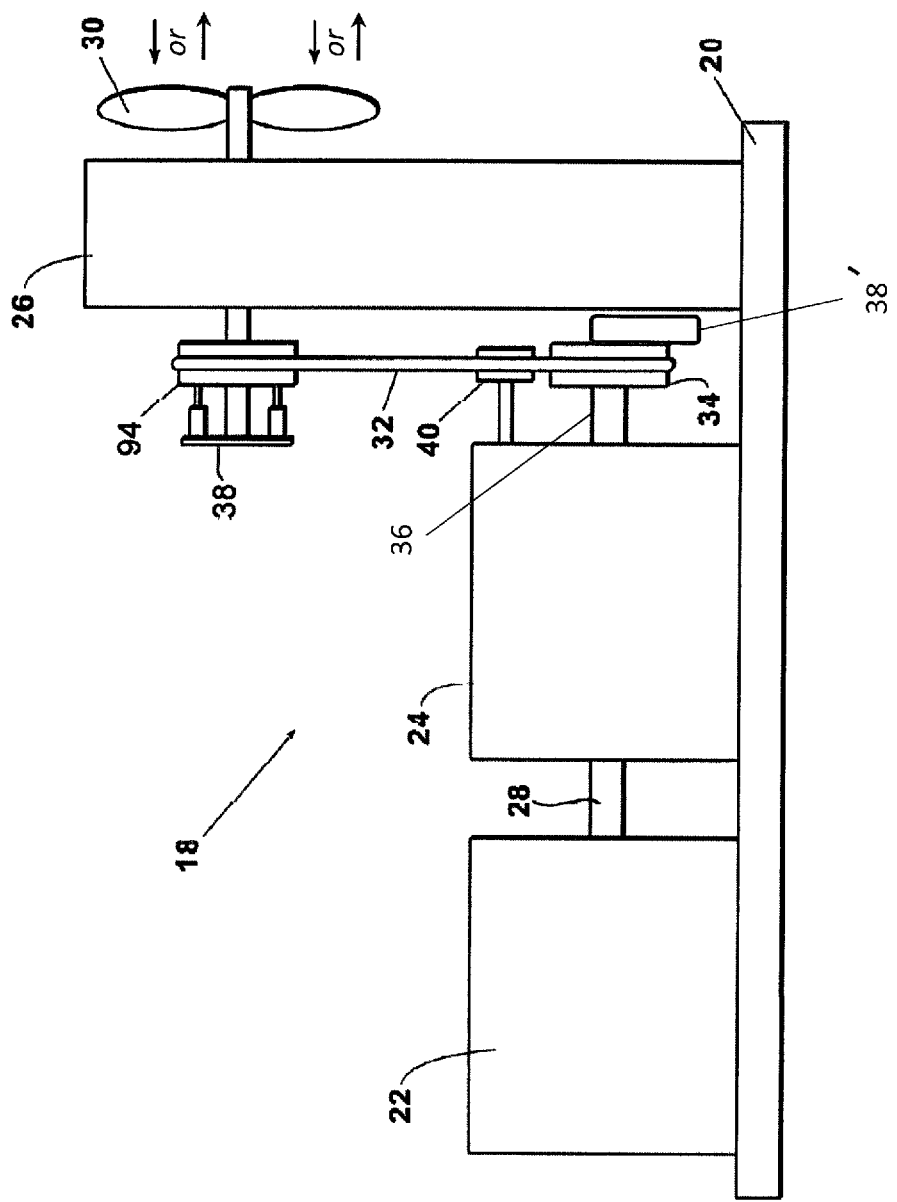
FIG. 1 is a schematic side view of one example of a skid mounted compressor assembly showing the general layout of the equipment.

Set forth below with reference to the accompanying drawings is a detailed description of embodiments of a system and method representing examples of the inventive system and method disclosed here. FIG. 1 illustrates the general physical layout of one embodiment of the disclosed system which is a skid mounted compressor assembly. In this illustrated embodiment, the system is comprised of a gas compressor 22, an internal combustion engine 24 and a fin fan cooler 26, all mounted on an equipment skid 20. The compressor 22 may be driven by the internal combustion engine 24 via a drive shaft 28. The fan 30 on the fin fan cooler 26 may be powered by the internal combustion engine 24 via a drive belt 32. A drive pulley 34 may be connected to the crankshaft 36 of the internal combustion engine 24. A magnetic variable speed drive 38 may be connected to the fan 30. The drive belt 32 transfers rotational power from the drive pulley 34 to the magnetic variable speed drive 38 and to the fan 30. The system may include an idler pulley 40 to remove slack from the drive belt 32 and ensure sufficient tension for efficient transfer of power between the drive pulley 34 and the magnetic variable speed drive 38.

Figure 2:
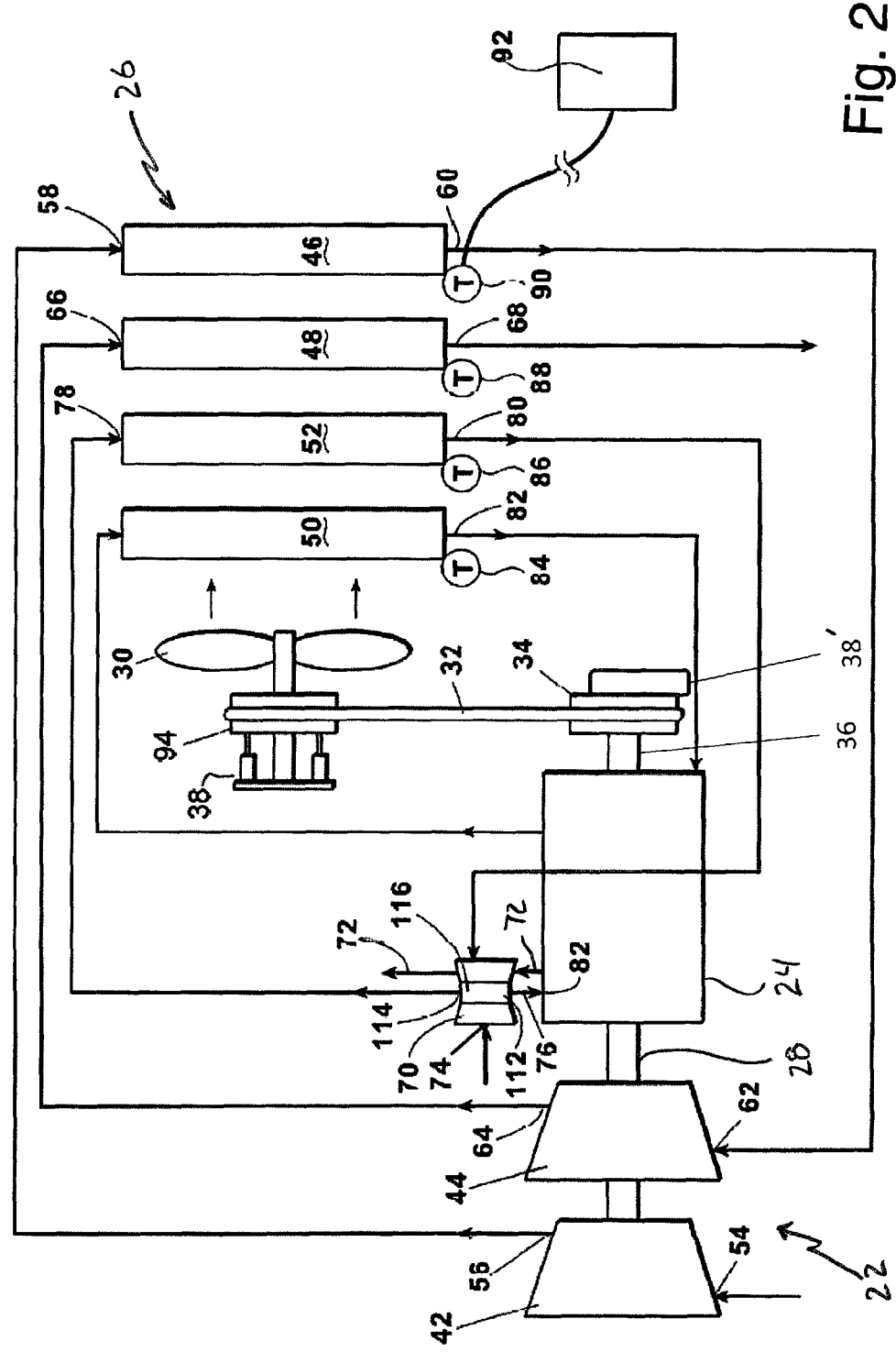
FIG. 2 is a schematic illustration depicting the flow of gases and cooling liquids.

FIG. 2 is a schematic view that provides the flow of the various gas flows and cooling liquid flows. In the example shown in FIG. 2, there are a first and second compression stages 42 and 44 as well as a first, second, third and fourth cooling stages 46, 48, 50 and 52. The first, second, third and fourth cooling stages 46, 48, 50 and 52 collectively constitute an example of part of the fin fan cooler. The fin fan 30 is also a part of the fin fan cooler 26. It should be understood that the disclosed system may include less or more compression stages and their corresponding less or more cooling stages. However for ease of explanation a two stage compression system is described.

Natural gas from a well or other source may enter the system 18 through the inlet 54 of the first compression stage 42 where it is compressed. The compressed gas leaves through the first compression stage outlet 56 which may be in fluid communication with the first stage cooling inlet 58. Heat is removed from the compressed gas as it passes through the first cooling stage 46. The cooled compressed gas leaves the first cooling stage 46 through the outlet 60 which may be in fluid communication with the inlet 62 of the second compression stage 44. The gas is compressed and leaves the second compression stage 44 via the outlet 64 which may be in fluid communication with the inlet 66 of the second cooling stage 48. The gas is cooled as it passes through the second cooling stage 48. The gas leaves the second cooling stage 48 via the outlet 68 and passes on to a pipeline or further processing which varies based on the specific installation. Condensate knockout drums and other liquid removal may also be incorporated in the process between the cooling stages and compression stages as necessary.

The third cooling stage 50 of the fin fan cooler 26 may be in fluid communication with the cooling system of the internal combustion engine 24. The third cooling stage 50 may thus cool the cooling fluid of the internal combustion engine 24.

The fourth cooling stage 52 in this example, provides cooling fluid for the intercooler 112 of the turbo (turbocharger) 70 on the internal combustion engine 24. The turbo 70 may be powered by the exhaust 72 leaving the internal combustion engine 24. This may be used to pressurize combustion air. The combustion air enters the turbo 70 through the inlet 74. It is pressurized in the turbo 70 and exits through the outlet 76 where it may be cooled in the intercooler prior to entering the intake 82 of the internal combustion engine 24. The compressed and cooled combustion air may be mixed with fuel and used in the operation of the internal combustion engine 24.

Cooling fluid leaves the intercooler 112 via the outlet 114 which may be in fluid communication with the inlet 78 of the fourth cooling stage 52 of the fin fan cooler 26. The cooling fluid is cooled and then leaves the fourth cooling stage 52 through the outlet 80 which may be in fluid communication with the inlet 116 of the intercooler 112. Many applications of the system disclosed by way of example here use a turbo charged engine thus the example includes a turbo 70 and fourth cooling stage 52, used to cool an intercooler 112. However the present invention may also be used with a normally aspirated engine in which case the intercooler would not be needed.

During operation of the system disclosed by way of example, the fan 30 may blow air across the first, second, third and fourth cooling stages 46, 48, 50 and 52. This helps remove heat from the compressed gas, compressed combustion air and cooling fluids flowing through the fin fan heat exchanger 26. Temperature sensors 84, 86, 88 and 90 may be located at the outlets 60, 68, 80 and 82 of the various stages to provide temperature information about the fluid at the outlets 60, 68, 80 and 82 of the various stages. The temperature detected at these points may be sent to a controller 92. The connection between the temperature sensors 84, 86, 88, and 90 and the controller 92 can be hardwired or wireless.

If the temperature at any one of these locations exceeds a preset upper limit, the speed of the fan 30 may be increased through operation of the magnetic variable speed drive 38. This increase in fan speed and air flow in turn increases the amount of the heat removed from the fluids flowing through the other side of the heat exchanger 26. The fan speed can be stepped up (increased) or down (decreased) incrementally based upon hitting predetermined temperature levels. FIG. 2 illustrates the fin fan 30 on one side of the cooling stages 46, 48, 50 and 52, but the fin fan 30 can be positioned on the opposite side of the cooling stages 46, 48, 50 and 52 forming a part of the fin fan cooler or heat exchanger 26 such as illustrated in FIG. 1.

Figure 3:
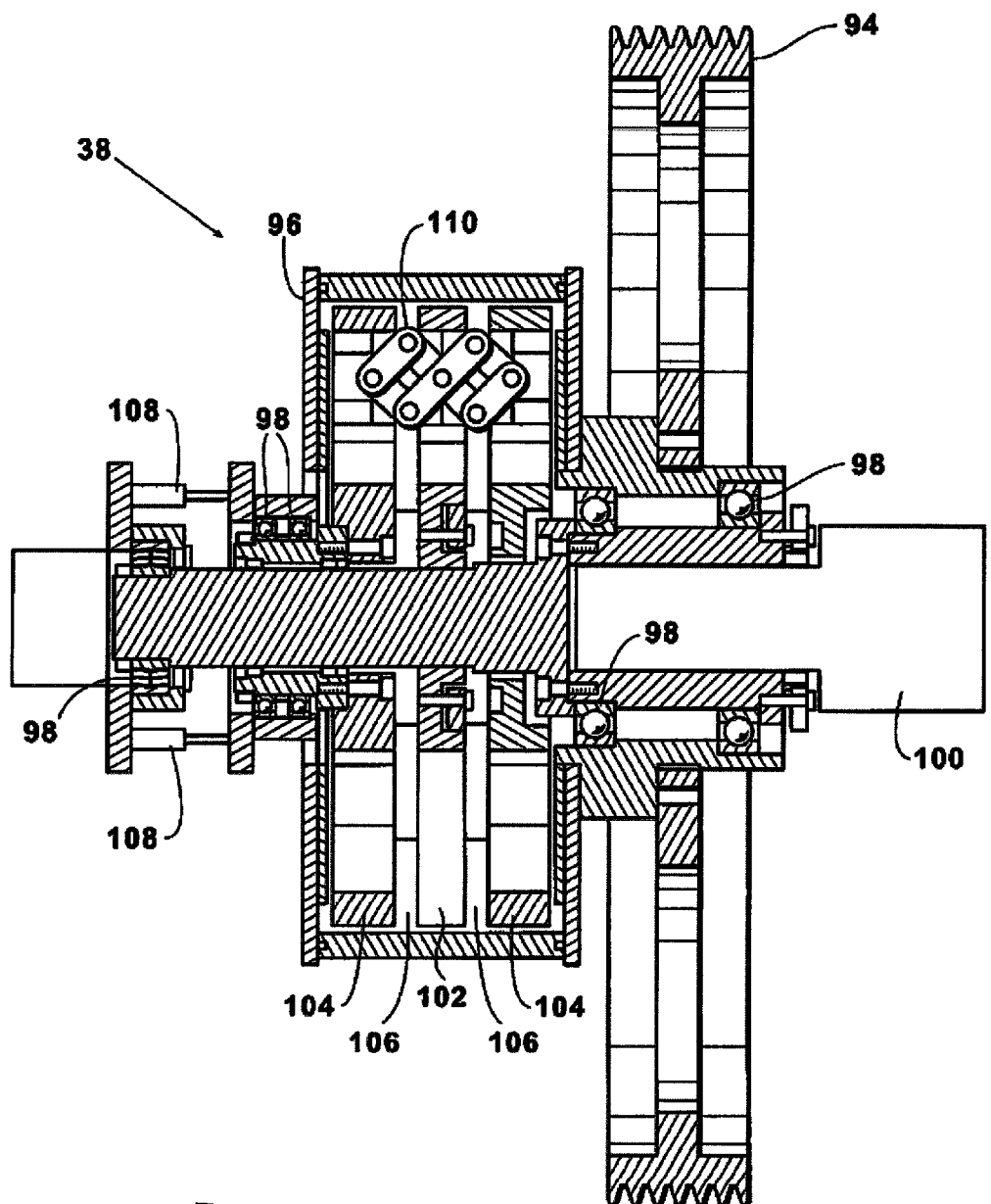
FIG. 3 is a cross section view of the magnetic variable speed drive device.

FIG. 3 provides a cross-sectional view of the magnetic variable speed drive 38. The drive 38 has a drive pulley 94 which receives rotational power from the drive belt 32. The drive pulley 94 and a disk assembly 96 rotate on a set of bearings 98 about the fan drive shaft 100. A disk 102 is fixedly coupled to and rotates with the fan drive shaft 100. The disk 102 is preferably non-ferrous. An example of a non-ferrous material for fabricating the disk 102 is copper. The disk assembly 96 also includes a pair of magnetic plates 104 located on either side of the disk 102. The magnetic plates 104 are plates made of magnetic material or plates that include magnetic material. The magnetic plates 104 are fixedly coupled to and rotate with the drive pulley 94. There is a gap 106 between the disk 102 and each plate 104. The disk 102 is attracted to the magnetic field of the plates 104. Thus, as the plates 104 rotate with the drive pulley 94, the disk 102 is attracted to the same rotation. It is this magnetic field which couples the drive pulley 94 to the fan drive shaft 100.

There is a natural slippage between the plates 104 and the disk 102. This slippage can be increased by increasing the gap 106 thus decreasing the fan speed. Conversely the fan speed can be increased by reducing the gap 106 and thus reducing the slip. The gap 106 can be adjusted through operation of the one or more solenoids 108. The solenoids 108 are operable by the controller 92. The linkage 110 ensures the gaps 106 on either side of the disk 102 remain equal.

The embodiment of the skid mounted compressor assembly (system) described above is configured so that rotation of the drive pulley 94 is transferred to the fan drive shaft 100 by way of the magnetic variable speed drive 38. Thus, the rotational drive of the magnetic variable speed drive 38 is directly delivered to the fan drive shaft 100. The magnetic variable speed drive 38 is thus positioned at an intermediate position, with reference to the rotation transmission path, relative to the drive pulley 94 and the fan drive shaft 100. In this embodiment, the magnetic variable speed drive 38 is coaxial with the fan drive shaft 100 and the drive pulley 94 as depicted in FIG. 3. That is, the rotation axis of the plates 104 and the disk 102 is coaxial with the rotation axis of the fan drive shaft 100.

The positioning of the magnetic variable speed drive is not limited to the positioning described above. For example, FIGS. 1 and 2 show that the magnetic variable speed drive 38' can be positioned at the crankshaft 36. At this location, the rotational speed is higher, and the dimension and weight of the drive/clutch can thus be reduced. Thus, in this alternative embodiment, the magnetic variable speed drive 38' is coaxial with the crankshaft 36 of the internal combustion engine 24. That is, the rotation axis of the plate 104 and the disk 102 is coaxial with the rotation axis of the crankshaft 36. Thus, in this alternative embodiment, the magnetic variable speed drive 38' is not coaxial with the fan drive shaft 100 and is not coaxial with the drive pulley 94.

Figure 4:
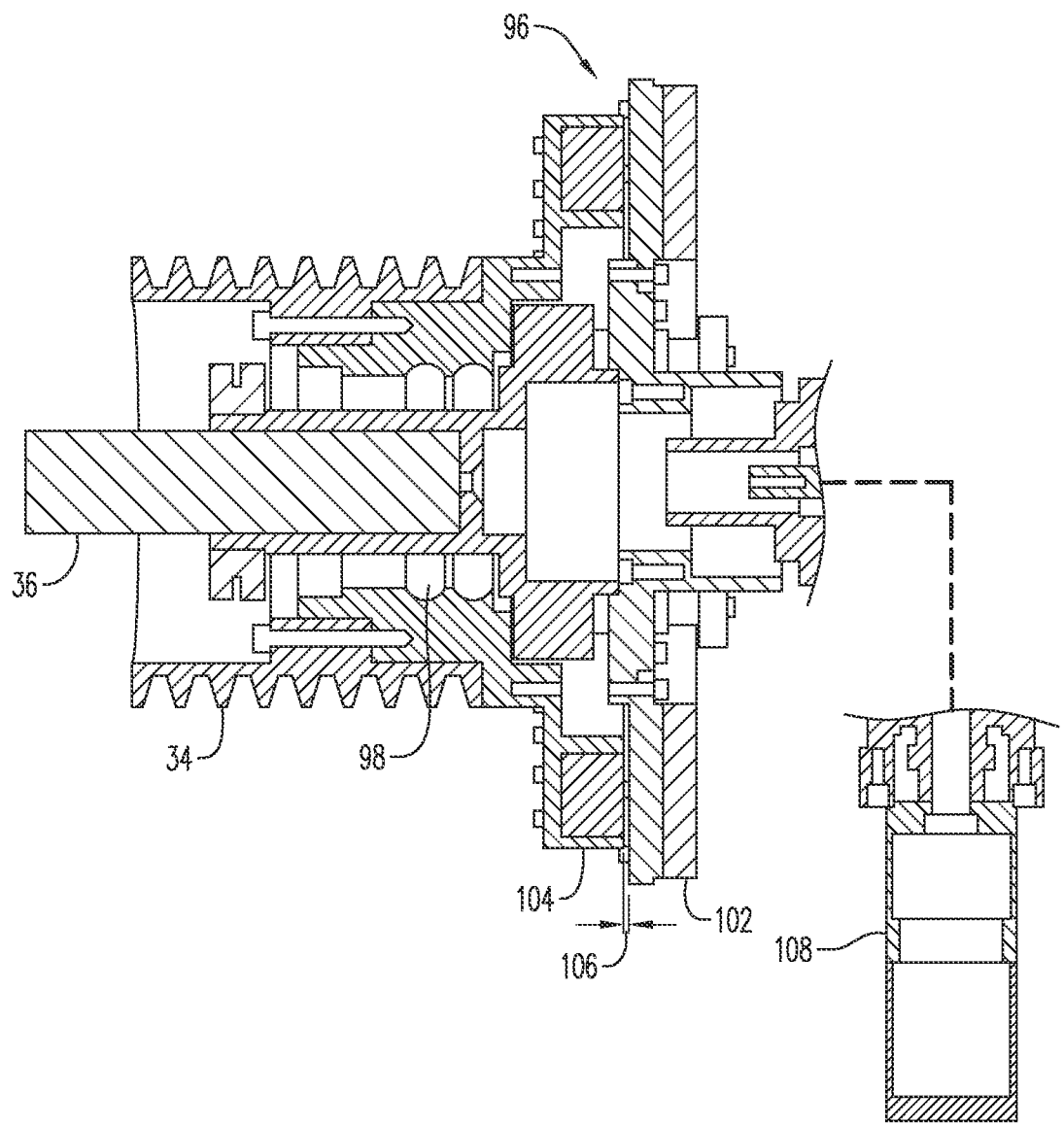
FIG. 4 is a cross-sectional view of another embodiment of the magnetic variable speed drive device.

FIG. 4 illustrates, in cross-section, the magnetic variable speed drive 38 connected to the crankshaft 36 and the drive pulley 34. In this embodiment, the disk assembly 96 forming a part of the magnetic variable speed drive 38' is comprised of the disk 102, preferably made of a non-ferrous material (e.g., copper) and plate 104 which may be made of magnetic material. The magnetic variable speed drive 38' has a drive pulley 34 which receives rotational power from the crankshaft 36. The drive pulley 34 and the disk assembly 96 rotate on a set of bearings 98 about the crankshaft 36. The disk 102 is fixedly coupled to and rotates with the crankshaft 36. The plate 104 is located in side-by-side spaced relation to the disk 102, and the plate 104 is fixedly coupled to and rotates together with the drive pulley 34. This embodiment of the magnetic variable speed drive 38' thus differs from the earlier described embodiment in that the FIG. 4 version includes only a single one of the magnetic plates 104 positioned in side-by-side spaced relation to the one disk 102. A gap 106 exists between the disk 102 and plate 104. The disk 102 made of non-ferrous material is attracted to the magnetic field of the plate 104. Thus, as the disk 102 rotates with the crankshaft 36, the plate 104 is attracted to the same rotation and so rotation of the disk 102 induces rotation of the plate 104. It is the plate's 104 magnetic field that couples the drive pulley 34 to the crankshaft 36.

There is a natural slippage between the plate 104 and the disk 102. This slippage can be increased by increasing the gap 106 between the plate 102 and the disk 102. Increasing the size of the gap (i.e., increasing the distance between the disk 102 and the plate 104) decreases the fan speed. Conversely the fan speed can be increased by reducing the size of the gap 106 (i.e., moving the disk 102 and the plate 104 relatively closer), thus reducing the slip. The size of the gap 106 (i.e., the distance between the disk 102 and the plate 104) may be adjusted through operation of the motor 108. The motor 108 may be operable by the controller 92.

The detailed description above describes embodiments of a system and method representing examples of the inventive system and method disclosed here. The invention is not limited, however, to the precise embodiments described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A system comprising:
   an internal combustion engine that includes a rotatable drive shaft that rotates during operation of the internal combustion engine and a rotatable crankshaft that rotates during operation of the internal combustion engine;
   a compressor operatively connected to the drive shaft of the internal combustion engine so that operation of the internal combustion engine rotates the drive shaft and powers the compressor to compress gas;
   a cooler including a rotatable cooling fan that rotates to cool the gas and/or the internal combustion engine;
   a magnetic variable speed drive that operatively connects the cooling fan to the crankshaft of the internal combustion engine so that rotation of the crankshaft is transmitted to the cooling fan by way of the magnetic variable speed drive;
   the magnetic variable speed drive including only a single plate and only a single disk that are spaced apart from one another, the single plate being comprised of magnetic material and producing a magnetic field, the single disk being comprised of non-ferrous material, the single disk being attracted to the magnetic field of the single plate to couple rotation of the crankshaft to rotation of the cooling fan; and
   a motor operatively connected to the magnetic variable speed drive to adjust a distance between the single disk and the single plate and thereby vary a speed of rotation of the cooling fan.

2. The system according to claim 1, wherein the single disk is fixed to the crankshaft so that rotation of the crankshaft results in rotation of the single disk.

3. The system according to claim 2, wherein the single plate is fixed to a drive pulley so that the single disk and the drive pulley rotate together.

4. The system according to claim 3, wherein the drive pulley is a first drive pulley and the cooling fan includes a driving shaft, and further comprising a second drive pulley and a belt extending around the first drive pulley and the second drive pulley, the second drive pulley being coaxial with the driving shaft of the cooling fan.

5. The system according to claim 1, wherein the magnetic variable speed drive is coaxial with the crankshaft of the internal combustion engine.

6. The system according to claim 1, wherein the internal combustion engine, the compressor and the cooler are mounted on a skid.

7. A system comprising:
   an internal combustion engine that includes a rotatable drive shaft that rotates during operation of the internal combustion engine and a rotatable crankshaft that rotates during operation of the internal combustion engine;
   a compressor connected to the drive shaft of the internal combustion engine so that rotation of the drive shaft powers the compressor to compress gas;
   a cooler including a plurality of cooling stages and a rotatable cooling fan that rotates to blow air across the plurality of cooling stages to cool the gas and/or the internal combustion engine;
   a magnetic variable speed drive connecting the crankshaft of the internal combustion engine to the cooling fan so that operation of the internal combustion engine results in rotation of the crankshaft that is transmitted to the cooling fan by way of the magnetic variable speed drive to rotate the cooling fan;
   the magnetic variable speed drive including only a single disk and only a single plate that are rotatable about an axis, positioned side-by-side and spaced apart from one another so that a gap exists between the single plate and the single disk, the single plate being comprised of magnetic material and producing a magnetic field, the single disk being comprised of non-ferrous material and being attracted to the magnetic field of the single plate to couple rotation of the crankshaft to rotation of the cooling fan; and a motor operatively connected to the magnetic variable speed drive change a size of the gap so that an increase in the size of the gap decreases a rotation speed of the cooling fan while a decrease in the size of the gap increases the rotation speed of the cooling fan.

8. The system according to claim 7, wherein the single disk is fixed to the crankshaft so that rotation of the crankshaft results in rotation of the single disk.

9. The system according to claim 7, wherein the single plate is fixed to a drive pulley so that the single plate and the drive pulley rotate together.

10. The system according to claim 9, wherein the drive pulley is a first drive pulley and the cooling fan includes a driving shaft, and further comprising a second drive pulley and a belt extending around the first drive pulley and the second drive pulley, the second drive pulley being coaxial with the driving shaft of the cooling fan.

11. The system according to claim 7, wherein the axis about which the single disk and the single plate rotate is coaxial with the crankshaft.

12. The system according to claim 7, wherein the plurality of cooling stages includes at least three cooling stages.

* * * * *